United States Patent [19]
Gaiser

[11] Patent Number: 5,724,307
[45] Date of Patent: Mar. 3, 1998

[54] METHOD FOR IMPROVING THE COUPLING RESPONSE OF A WATER-BOTTOM SEISMIC SENSOR

[75] Inventor: James E. Gaiser, Littleton, Colo.

[73] Assignee: Western Atlas International, Inc., Houston, Tex.

[21] Appl. No.: 838,885

[22] Filed: Apr. 14, 1997

[51] Int. Cl.[6] .................................................. G01V 1/36
[52] U.S. Cl. .................................. 367/21; 181/401
[58] Field of Search ............................ 367/15, 21, 24; 181/122, 401, 402

[56] References Cited

U.S. PATENT DOCUMENTS 5,163,028  11/1992  Barr et al. ........................ 367/21

OTHER PUBLICATIONS

Vertical Seismic Profile Sonde Coupling; James E. Gaiser, et al, Geophysics, vol. 53, No. 2 (Feb. 1988); pp. 206–214, 18 Figures.

Primary Examiner—Ian J. Lobo
Attorney, Agent, or Firm—William A. Knox

[57] ABSTRACT

A receiver consistent deconvolution operator models the damped oscillatory wavetrain that is related to geophone coupling to the water bottom. The operator is a best-fitting function that endeavors to describe the difference in coupling response between a well-coupled in-line geophone relative to an imperfectly-coupled cross-line geophone. The operator is applied to the cross-line signals to compensate the signals for the distortion due to imperfect cross-line ground coupling.

3 Claims, 7 Drawing Sheets

METHOD FOR IMPROVING THE COUPLING RESPONSE OF A WATER-BOTTOM SEISMIC SENSOR

BACKGROUND OF THE INVENTION

1. Field of the Invention

This invention is concerned with improving the coupling response of a multi-axis seismic sensor or geophone implanted on a water bottom with particular attention to the sensor whose axis of sensitivity is spatially polarized along the cross-line axis.

2. Discussion of Relevant Art

Although the basic principles of seismic exploration are well known, a brief tutorial exegesis of the geophysical problems to be addressed by this invention now will be presented.

Figure 1:
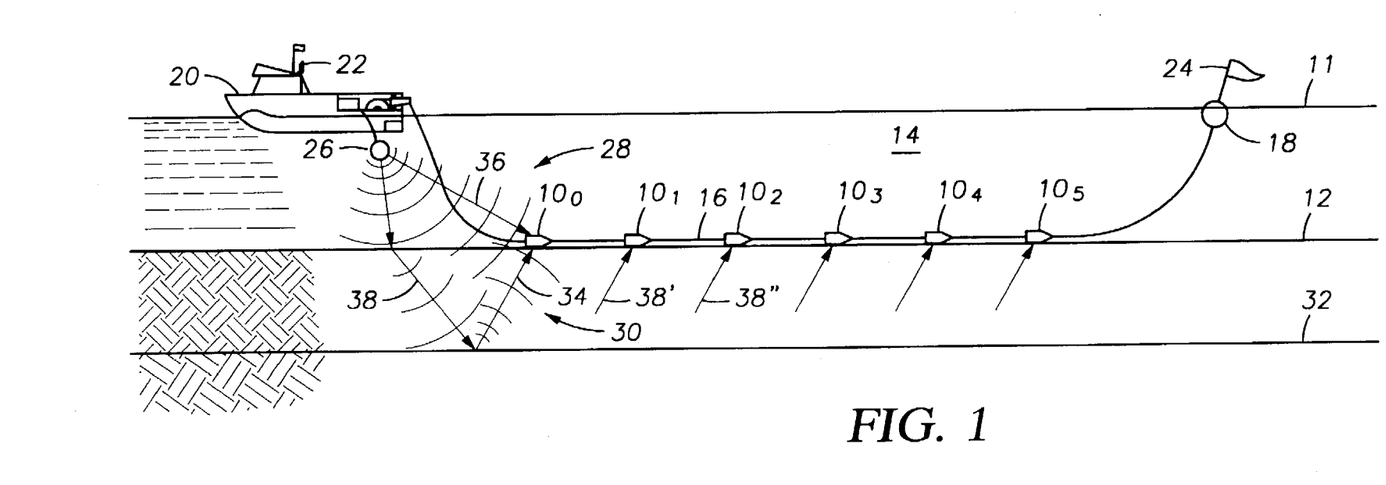
FIG. 1 is a conventional view of a ship servicing an ocean-bottom cable to which are coupled a plurality of multi-axis sensors.

Please refer to FIG. 1 where a line of seismic transducers $10_0, 10_1, 10_2, \ldots, 10_s$ (s=3, 4, ..., n, where n is a large integer) are shown laid on the bottom 12 of a body of water, 14 (which may be for example, the open ocean, a lake, a bay, a river, a reservoir) spaced-apart by a desired spacing such as 25 meters. For purposes of this disclosure, the transducers are multiaxial motion-sensitive devices. In this disclosure, the terms "sensor", "receiver", "geophone" are synonymous. The terms refer to a mechanical-motion transducer which measures particle velocity. It to be distinguished from a hydrophone which is a pressure transducer.

The sensors are mechanically and electrically coupled to an ocean-bottom cable 16, one or both ends of which may be marked at the water surface 11 by a buoy such as 18. In practice, the cable 16 may be hundreds or thousands of feet long to which are attached many hundreds of sensors. For 3-D areal surveys, a number of cables may be laid out parallel to each other in a wide swath.

Usually, the cables and sensors are laid out over the area to be surveyed by a cable-tender boat. At some later time, a service ship such as 20 visits designated stations and retrieves one or more cables such as 16 from the water bottom, the ends having been flagged by buoys as shown. Cable 16 includes a plurality of internally-mounted communication channels (not shown), that may be electrical, optical, or in some cases ethereal, for transmitting the sensor output signals to digital data-recording and data-processing channels of any well known type (not shown) in ship 20. Ship 20 is equipped with a precision navigation means such as a GPS receiver and may include a radar beacon 22 for ranging on a radar reflector 24 mounted on tail buoy 18 at the other end of cable 16.

An acoustic sound source is fired at selected shot locations which may be spaced apart by an integral multiple of the sensor spacings. Source 26 radiates wavefields such as generally shown by 28 and 30 to insonify subsurface earth layers such as 32, whence the wavefield is reflected back towards the surface as reflected wavefield 34. The sensors $10_s$ intercept the mechanical earth motions, convert those motions to electrical signals and send those signals through the communication channels to the recording equipment in ship 20.

Figure 5:
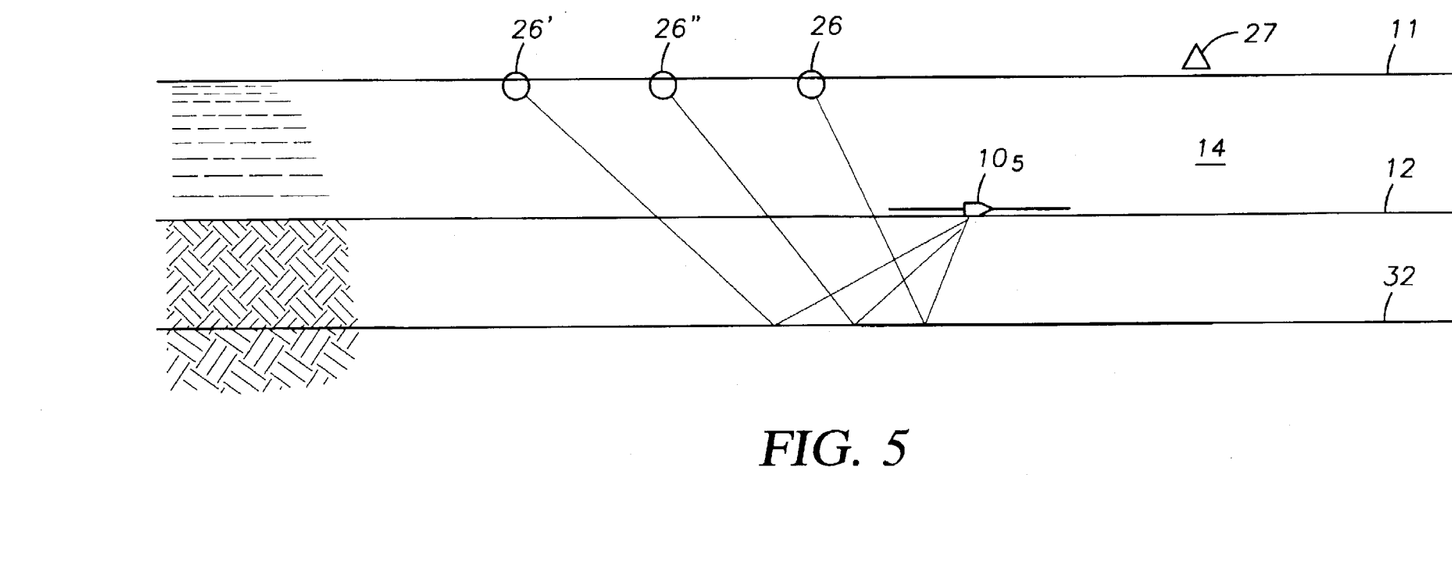
FIG. 5 illustrates the concept of common receiver gathers.

A wavefield may propagate along a direct travel path such as 36 or along reflected-ray travel paths such as 38, 38' and 38" to the respective sensors $10_s$. The recorded data are presented in the form of time-scale traces, one trace per sensor/shot. A collection of time-scale traces resulting from a single source activation (a shot) that insonifies a plurality of receivers, such as in FIG. 1, constitutes a common source gather. On the other hand, with reference to FIG. 5, a collection of time-scale traces as recorded by a single sensor $10_s$ after insonification by a plurality of spaced-apart shots 26, 26', 26" constitutes a common receiver gather. The space between a shot location and the surface expression, 27, of sensor $10_s$ is the offset.

Typically in 3-D operations ship 20 occupies a central location, interconnected with a plurality of receivers, while a second shooting ship (not shown) actually visits the respective designated survey stations to generate common receiver gathers. The practice is necessarily required in 3-D because the survey stations are scattered over a two-dimensional area rather than being restricted to a single line of profile.

Figure 2:
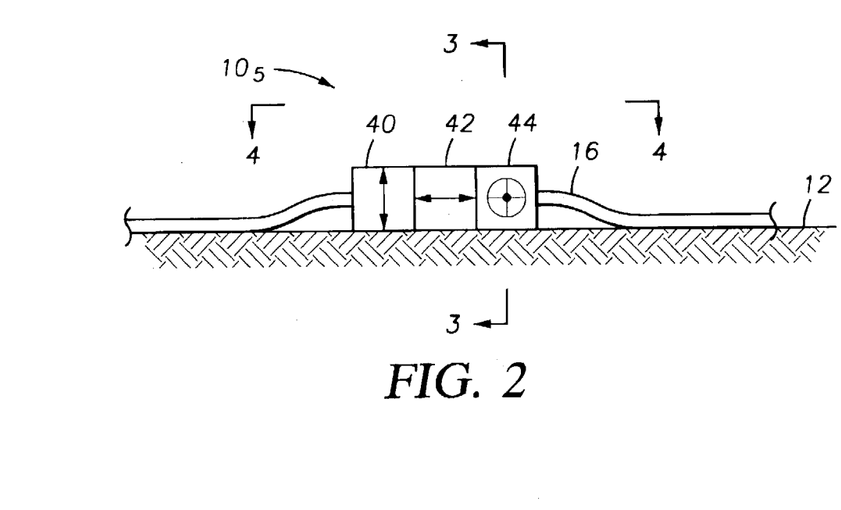
FIG. 2 is an X-ray-like cross section of a three-axis seismic sensor.

FIG. 2 is a close-up, X-ray-like side view of a multi-axis motion sensor $10_s$. The sensitive axes may be vertical, unit 40; in-line, unit 42; cross-line, unit 44. Usually, the two horizontally-polarized sensors preferably respond to shear waves and the vertical sensor responds to compressional waves. In some cases a two-axis instrument may be used for detecting shear waves only, with the sensor units directionally polarized along orthogonal x and y axes.

The multi-axis units are customarily packaged in a single case and internally gimbal-mounted so as to become automatically aligned along their mutually orthogonal axes after deposition on the sea floor. For good and sufficient reasons, the case containing the sensor components is usually cylindrical. Cable 16 is relatively heavy. Secured to the fore and aft ends of the sensor case, the cable 16 firmly holds the multi-axis motion sensor to the sea floor 12. The in-line unit 42 is well coupled to sea floor 12 because it is oriented in the direction of the cable 16. In this direction, the area of contact with the sea floor is relatively large. Not so, the cross-line unit.

Figure 3:
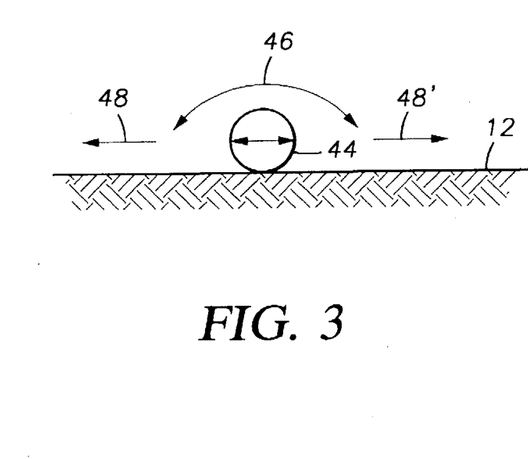
FIG. 3 is an end view of the three-axis seismic sensor.

FIG. 3 is an X-ray-like cross section of multi-axial sensor $10_s$ taken along line 3–3', looking back towards ship 20. Because of its cylindrical shape, case $10_s$ not only rolls from side to side as shown by curved arrows 46, but water currents and other disturbances can cause the sensor to shift laterally in the cross-line direction as shown by arrows 48, 48'. Those disturbances do not affect the in-line units because of their respective polarizations but they do introduce severe noise to the cross-axis signals.

Figure 4:
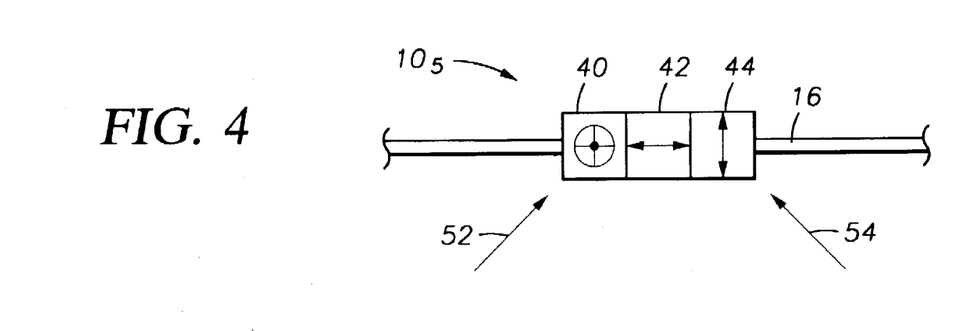
FIG. 4 is a view of the three axis sensor of FIG. 2 as seen from above.

FIG. 4 is multi-axis sensor $10_s$ as viewed from above along line 4–4' of FIG. 2. This Figure will be referenced again later.

A geophone as used on ocean-bottom cables is a spring-mass oscillatory system. Assuming perfect coupling, the transfer function of a geophone can be described in terms of damping, $\eta$, resonant or natural frequency, $\omega$, and phase angle, $\phi$, relative to an input step function. Customarily geophones are damped at about 0.7 of critical at a resonant frequency of about 10–20 Hz. Assuming use of a velocity phone, below the natural frequency, the attenuation rate is 12 dB per octave; well above the natural frequency, the response is substantially constant within the useful seismic frequency band. The phase response may be non-linear below the resonant frequency and lags about 90° behind the input transient above that value. Other signal distortions may be superimposed on the sensor output signals due to the respective transfer functions characteristic of the data transmission channels and the data processing equipment.

Instrumental response parameters can, of course be predicted on the basis of design criteria. But an imperfect earth-coupling response cannot be predicted. Multi-axis seismic sensors are essential for use in shear-wave surveys where, for example, in-line and cross-line shear waves are resolved to measure the azimuth of substantially-vertical formation fracturing. It is evident that if the cross-line sensor response is distorted relative to the in-line sensor response, the resulting azimuth determination will be flawed. Resource-exploitation operations premised on flawed data is doomed to economic catastrophe.

A method for correcting poor coupling of a logging sonde in a borehole was described in a paper by J. E. Gaiser et al., entitled Vertical Seismic Profile Sonde Coupling, published in Geophysics n. 53, pp 206–214, 1988. However that method is not directly applicable to 3-D seismic exploration. There is a long-felt need for a method for measuring and suppressing signal distortion attributable to poor water-bottom coupling of one of the components of a cable-mounted, multiaxial sensor.

SUMMARY OF THE INVENTION

This is a method for removing objectionable ground-coupling response characteristics from seismic signals due to an imperfect ground coupling of a seismic receiver that is polarized in the cross line direction relative to a well-coupled, co-located seismic receiver polarized in the in-line direction. Along a preselected source-receiver trajectory vector, a plurality of in-line seismic-signal wavetrains emanating from an in-line receiver is assembled into a first common-receiver trace gather. Similarly a plurality of cross-line seismic-signal wavetrains emanating from a seismic receiver that is co-located with the in-line receiver are gathered in a second common-receiver trace gather. Each of the seismic-signal wavetrains resident in the respective first and second common-receiver trace gathers is auto-correlated in the time domain to provide a plurality of in-line and cross-line auto correlations. The respective in-line auto-correlations are normalized to unity and the respective cross-line auto-correlations are normalized to the corresponding in-line auto-correlations. The normalized cross-line auto-correlations are scaled to compensate for the difference between the cross-line polarization direction and the pre-selected source-receiver trajectory vector. The normalized in-line auto-correlations and the normalized, scaled cross-line auto-correlations are averaged and the averages are transformed to the frequency domain to define in-line and cross-line amplitude spectra. The cross-line auto-correlation is deconvolved by the in-line auto-correlation to define a coupling deconvolution operator. The coupling deconvolution operator is applied to the cross-line seismic-signal wavetrains resident in the cross-line common-receiver trace gather to remove the imperfect ground-coupling response characteristics from the cross-line receiver signals.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

A deconvolution operator is desired that forms a receiver-consistent model of a damped oscillatory system that best describes the cross-line geophone coupling to the sea bed relative to that of a (theoretically) perfectly-coupled in-line sensor. The coupling response is then removed from the cross-line signals. It is assumed that the instrumental response characteristics are common to both receivers and are of no concern for purposes of this disclosure.

At a first receiver station, a first common receiver gathers of seismic signal traces are assembled, from an in-line receiver, $x_s$, and a second common receiver gather of seismic signal traces from a co-located cross-line receiver, $y_s$. The signals derive from many source stations areally distributed over the three-dimensional volume of the region of interest.

Figure 6:
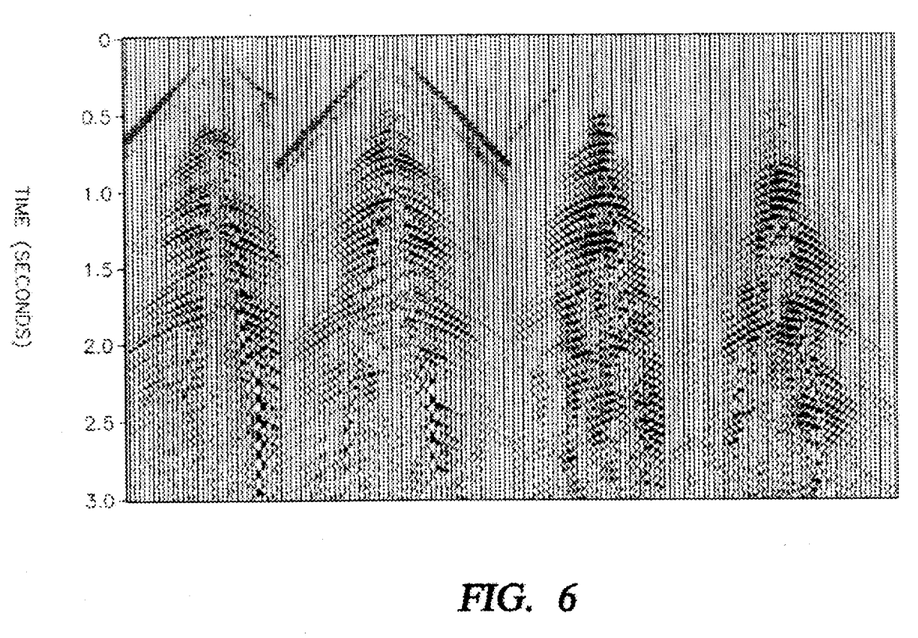
FIG. 6 is a panel showing an in-line gather of seismic signals in comparison with a cross-line gather of seismic signals showing the effects of poor cross-line ground coupling.

FIG. 6 is a panel showing first and second (counting from the left) in-line common trace gathers and third and fourth cross-line common trace gathers. The first and third and the second and fourth gathers are co-located. On the cross-line gathers, the first arrivals are greatly attenuated and a high-amplitude 20-Hz ringing-type interference is present. The 20-Hz interference is believed due to imperfect earth coupling.

Source-receiver data pairs are selected having a source-receiver trajectory vector along an azimuth that is about 45°, ± some angular tolerance, to the mutual axial alignment of both of the horizontally-polarized receivers such as shown by the vectors 52 or 54, FIG. 4. Those data should therefore posses roughly equal signal levels in both components. It is preferable that a plurality of different source-receiver offsets, such as 0.0–500 meters be used over some preselected reflection-time window such as 3.0 seconds, counting from the first breaks.

Auto correlate each in-line source-receiver trace pairs of the common receiver gather as follows:

$$\phi_{xx}(\tau) = \sum_{t=0}^{T} x_s(t)x_s(t+\tau) / \sum_{t=0}^{T} x_s(t)^2 \quad (1)$$

Similarly, auto-correlate the cross-line source-receiver trace pairs:

$$\phi_{yx}(\tau) = \sum_{t=0}^{T} y_s(t) y_s(t+\tau) / \sum_{t=0}^{T} x_s(t)^2 \qquad (2)$$

where the in-line auto-correlations are normalized to unity and each cross-line auto correlations are normalized relative to its in-line companion. T is the length of the time window, $\tau$ is the phase lag and $x_s$, $y_s$ are the trace-bin idents for the in-line and the cross-line traces.

The cross-line responses must be balanced by a scale factor $\chi$ to correct for the level of the signal projected into the cross-line direction:

$$\chi = |1/\tan(\theta_s - \theta_x)| \qquad (3)$$

where $\theta_s$ is the source-receiver azimuth and $\theta_x$ is the orientation of the in-line receiver. The scaled auto-correlations $\phi_{yy}$ scaled by $\chi$ and the in-line auto-correlations $\phi_{xx}$ are then averaged $\Phi_{xx}$ and $\Phi_{yy}$. $\Phi_{xx}$ represents an estimate of the source-receiver response, multiples of the geological response and earth attenuation. The $\Phi_{yy}$ response is representative of essentially the same parameters but with the cross-line coupling response added.

Figure 7:
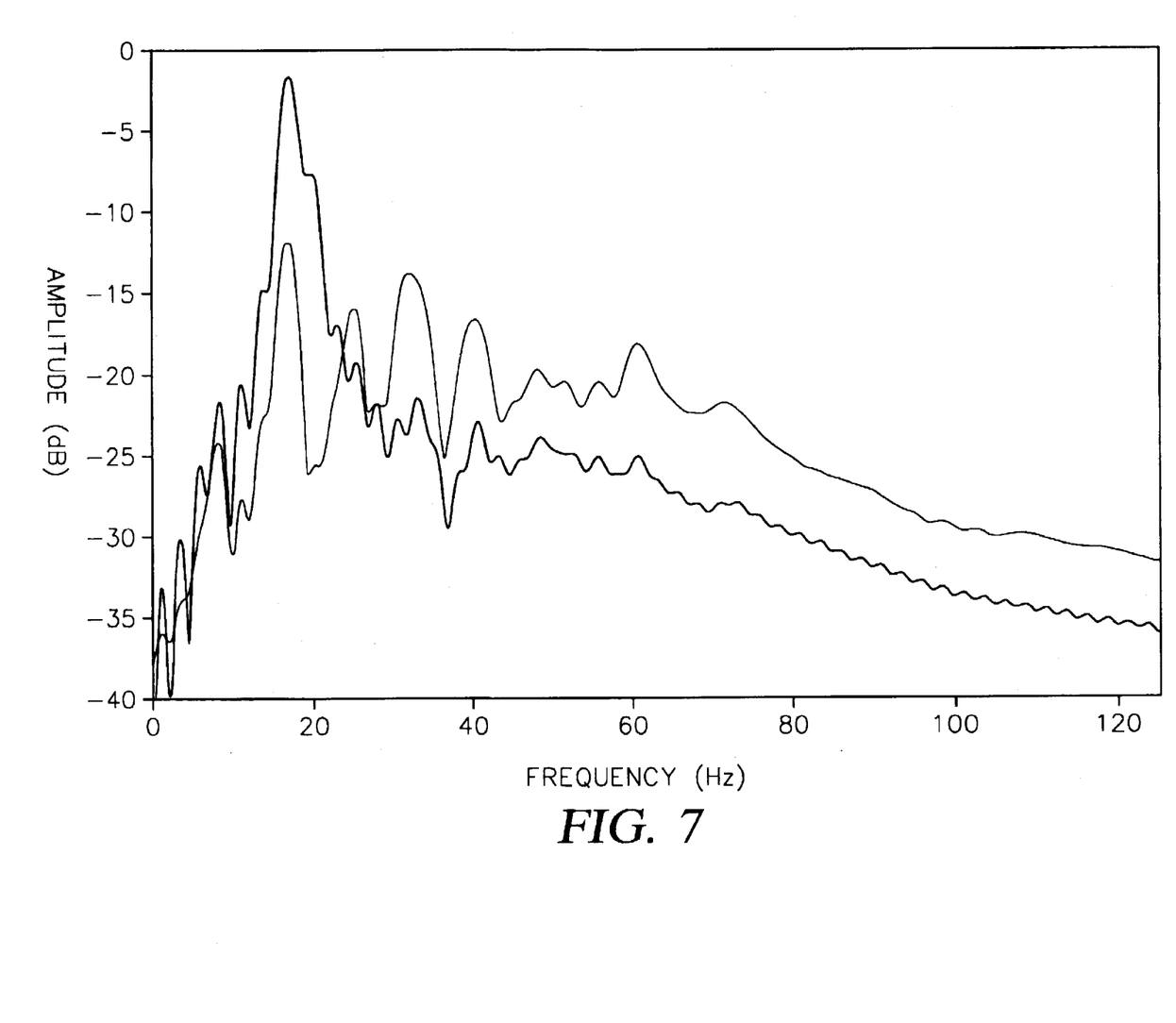
FIG. 7 are the amplitude spectra of the in-line and the cross-line auto-correlations.

The average response functions are transformed to the frequency domain to provide in-line and cross-line amplitude spectra as shown in FIG. 7 where the bold curve is the cross-line response. The spectral ratio, in the frequency domain, of the average cross-line response to the average in-line response is shown as the thin curve in FIG. 8. That curve was computed by deconvolving the cross-line response by the in-line response in the time domain. Specifically, the deconvolution operator is the inverse of $\Phi_{xx}$, such that when it is convolved with $\Phi_{xx}$, an impulse results from that operation. Convolving that operator with $\Phi_{yy}$ results in the thin curve of FIG. 8 after transformation to the frequency domain. If the average cross-line response, $\Phi_{yy}$, were identical to $\Phi_{xx}$, that response function would be an impulse with an otherwise flat response spectrum. The deconvolution could, of course by done on individual data pairs rather than on the average of the pairs, if desired.

Figure 8:
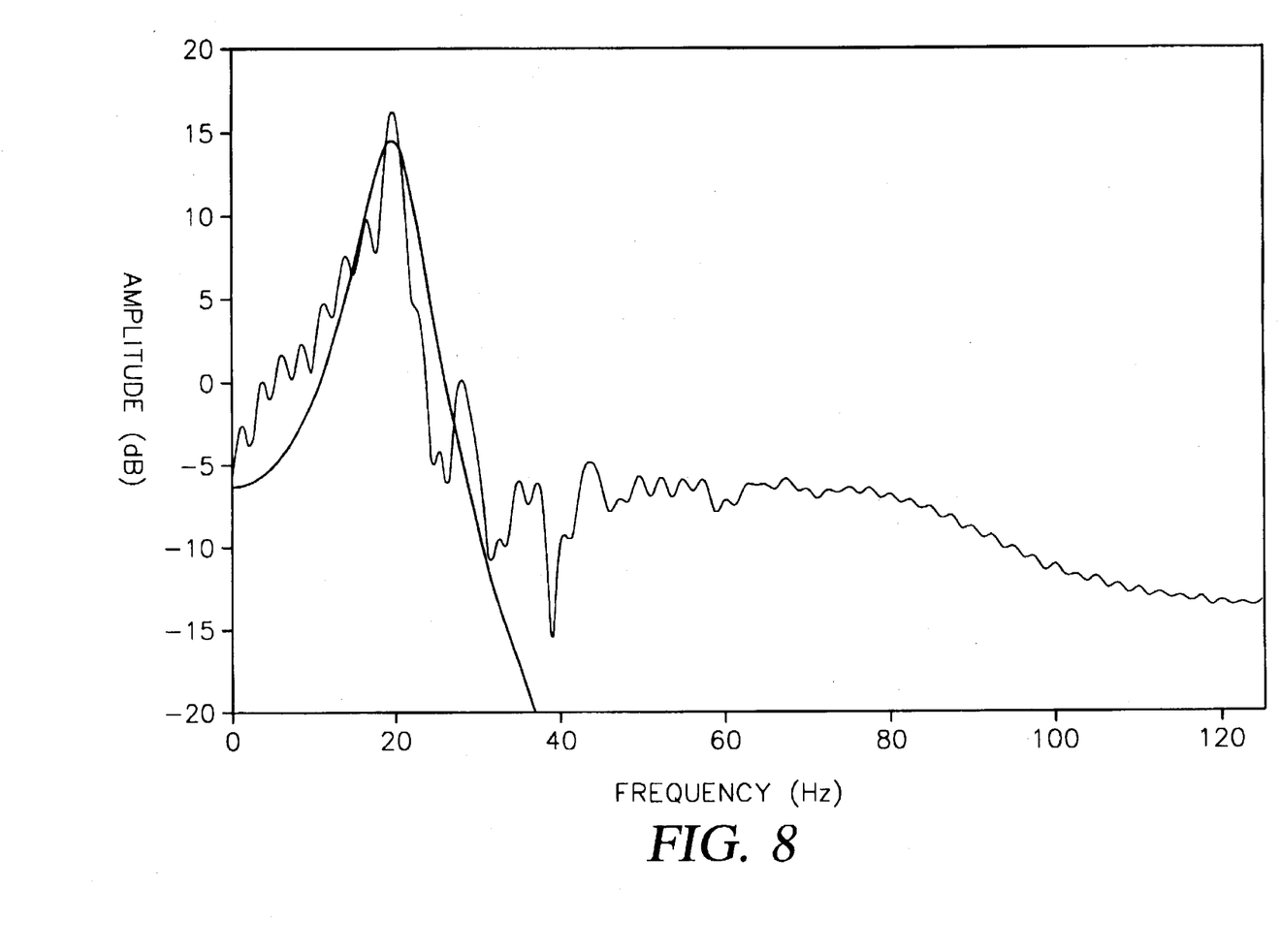
FIG. 8 show the ratio between the in-line and cross-line responses and the best-fitting estimate of the coupling response.

It is now required to determine the mechanical coupling parameters of a damped oscillatory system that best fits the observed spectrum. The parameters are the resonant or natural frequency $\omega_0$ and damping parameter $\eta$ which can be determined by any number of well-known methods, one of which is presented here by way of example but not by way of limitation. The damped oscillatory system describing the coupling response may take the form $$C(\omega) = \frac{1}{1 - \omega^2(\omega_0^2 - i2\omega_0\eta\omega)^{-1}} \qquad (4)$$

where $\omega$ is the angular frequency and $i=\sqrt{-1}$. It can be shown that $$\omega_0 = \frac{2\eta}{\sqrt{\sqrt{1+8\eta^2}-1}} \Omega_0 \qquad (5)$$

where $\Omega_0$ is the frequency at which the peak occurs in FIG. 8. Substituting (5) into (4) at the peak frequency where $\omega=\Omega_0$ and after a bit of algebraic manipulation, it can be shown that $$|C(\Omega_0)|^2 = \left| \frac{\overline{\Phi_{yy}}(\Omega_0)}{\overline{\Phi_{yy}}(0)} \right|^2 = \frac{16\eta^4}{(16\eta^4 - 8\eta^2 - 2) + 2\sqrt{1+8\eta^2}} \qquad (6)$$

where $\overline{\Phi_{yy}}(\Omega_0)$ and $\overline{\Phi_{yy}}(0)$ are the values of the frequency spectrum of the average auto-correlations after deconvolution at the maximum frequency and DC respectively.

Equation (6) is solved iteratively for $\eta$ where the left hand side of (6) is greater than unity. Substituting $\eta$ in (5) gives $\omega_0$. The bold curve in FIG. 8 is the best fitting damped oscillatory response for $\omega_0$ and $\eta$.

Figure 9:
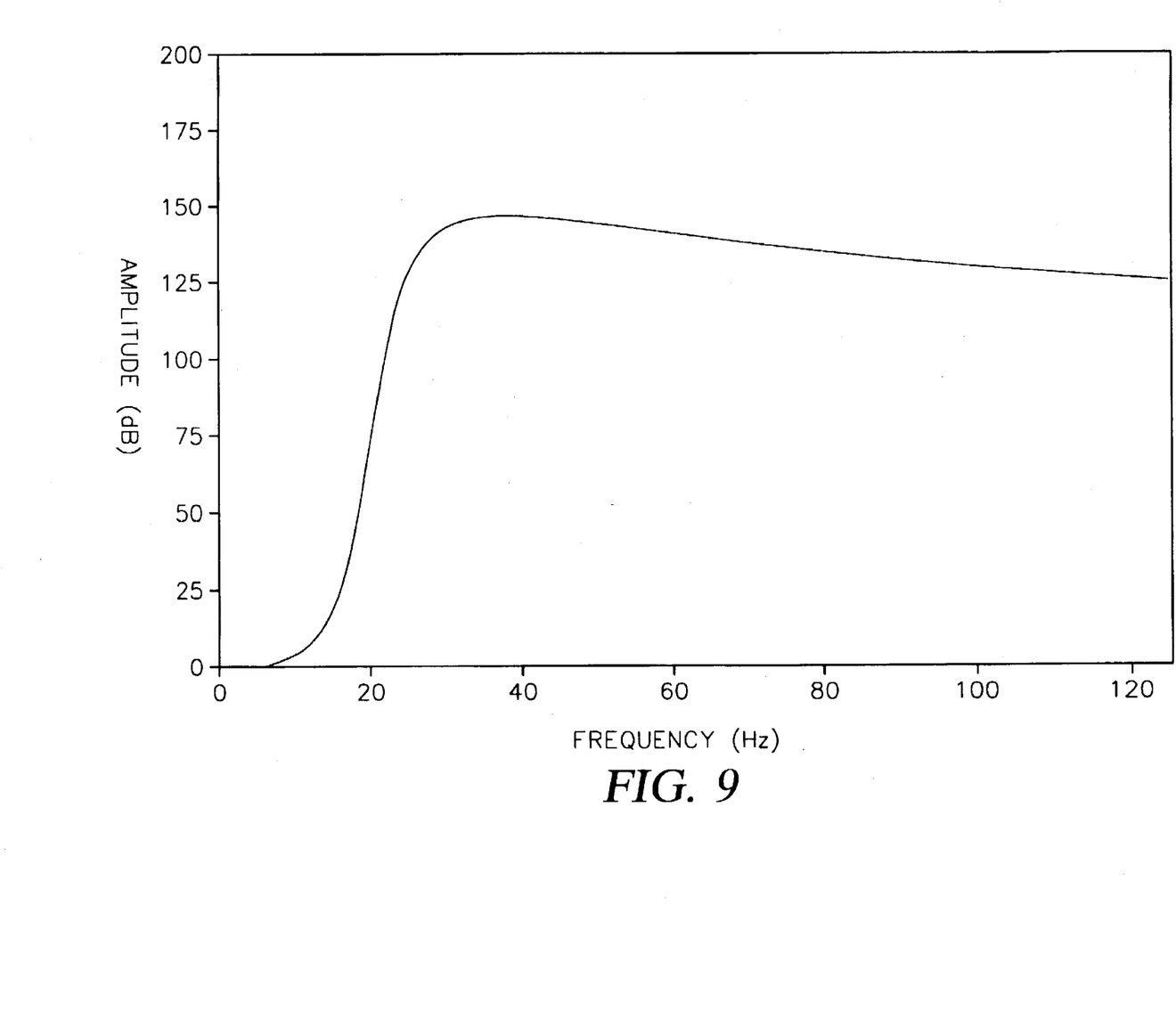
FIG. 9 is the phase response of the best-fitting estimate of FIG. 8.
Figure 10:
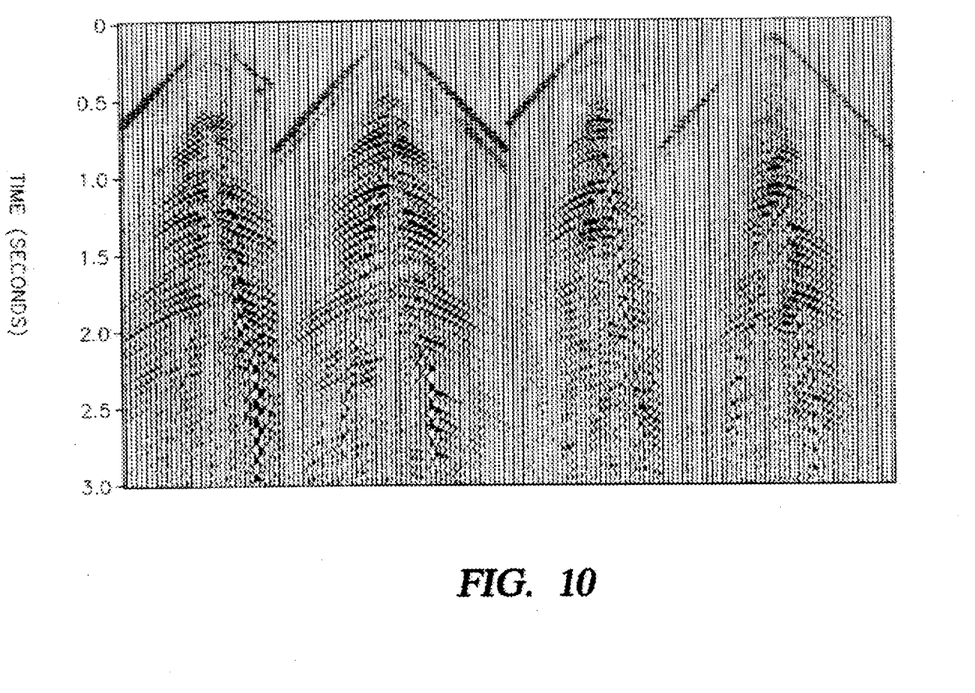
FIG. 10 is the panel of FIG. 6 after compensation for imperfect ground-coupling response of the cross-line receiver.

The deconvolution operator is applied, by frequency domain division, to all of the cross-line geophone signal traces for a specific receiver station. FIG. 10 shows the results. The in-line signals are unchanged but the 20-Hz oscillatory response has been removed from the cross-line data panel. The phase effects of the cross-line coupling response as shown in FIG. 9 have been removed. The first-arrival transients on the cross-line panel have been enhanced.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A method for removing objectionable ground-coupling response characteristics from seismic signals due to an imperfectly-coupled seismic receiver polarized in a cross-line direction, relative to a well-coupled, co-located seismic receiver polarized in an in-line direction, comprising:

along a preselected source-receiver trajectory vector, assembling a plurality of in-line seismic-signal wavetrains emanating from a selected in-line seismic receiver in a first common-receiver gather and assembling a plurality of cross-line seismic-signal wavetrains emanating from a co-located cross-line receiver in a second common-receiver gather;

in the time domain, individually auto-correlating each of the seismic-signal wavetrains resident in the respective first and second common-receiver gathers to provide a plurality of in-line and cross-line auto correlations;

normalizing the respective in-line auto-correlations to unity and normalizing the respective cross-line auto-correlations to the corresponding in-line auto-correlations;

scaling the normalized cross-line auto-correlations to compensate for the difference between the cross-line polarization direction and the pre-selected source-receiver trajectory vector;

averaging the normalized in-line auto-correlations and the normalized, scaled cross-line auto-correlations and transforming same to the frequency domain to define in-line and cross-line amplitude spectra;

deconvolving the cross-line auto-correlation by the in-line auto-correlation to define a coupling deconvolution operator; and applying the coupling deconvolution operator to the cross-line seismic-signal wavetrains resident in the cross-line common-receiver gather to compensate said signals for the imperfect ground-coupling response characteristics due to the cross-line receivers.

2. The method as defined by claim 1, wherein:
   the source-receiver trajectory vector is selected to substantially equalize the signal levels of the in-line and the cross-line auto-correlations except for the effects on the signals due to the difference in the ground-coupling characteristics of the respective receivers.

3. The method as defined by claim 2, wherein:
   the deconvolution is accomplished by frequency-domain division.

* * * * *